(12) United States Patent
Michael et al.

(10) Patent No.: US 7,502,941 B2
(45) Date of Patent: Mar. 10, 2009

(54) WIRELESS DATA COMMUNICATION METHOD AND APPARATUS FOR SOFTWARE DOWNLOAD SYSTEM

(75) Inventors: Lachlan Michael, Saitama (JP); Miodrag Mihaljevic, Tokyo (JP)

(73) Assignee: Sony Corporation, Tokyo (JP)

( * ) Notice: Subject to any disclaimer, the term of this patent is extended or adjusted under 35 U.S.C. 154(b) by 737 days.

(21) Appl. No.: 10/271,004

(22) Filed: Oct. 15, 2002

(65) Prior Publication Data
US 2003/0099358 A1 May 29, 2003

(30) Foreign Application Priority Data
Oct. 16, 2001 (JP) ............................. 2001-317738

(51) Int. Cl.
G06F 11/30 (2006.01)
G06F 1/24 (2006.01)
(52) U.S. Cl. .................... 713/189; 713/100; 713/194
(58) Field of Classification Search ......... 713/169–183, 713/189, 200, 100, 194
See application file for complete search history.

(56) References Cited

U.S. PATENT DOCUMENTS

| | | | | |
|---|---|---|---|---|
| 5,195,130 A | * | 3/1993 | Weiss et al. ............... | 379/93.19 |
| 5,421,006 A | * | 5/1995 | Jablon et al. ................. | 714/36 |
| 5,974,549 A | * | 10/1999 | Golan ........................ | 726/23 |
| 6,105,134 A | * | 8/2000 | Pinder et al. ................ | 713/170 |
| 6,141,756 A | * | 10/2000 | Bright et al. ................ | 726/22 |
| 6,842,433 B2 | * | 1/2005 | West et al. .................. | 370/312 |
| 7,117,357 B2 | * | 10/2006 | Bade ........................ | 713/151 |
| 7,203,842 B2 | * | 4/2007 | Kean ........................ | 713/189 |
| 2001/0001014 A1 | * | 5/2001 | Akins et al. ................. | 380/241 |
| 2002/0045441 A1 | * | 4/2002 | Ralston et al. ............... | 455/418 |
| 2002/0154779 A1 | * | 10/2002 | Asano et al. ................ | 380/277 |
| 2004/0029575 A1 | * | 2/2004 | Mehta ....................... | 455/419 |

OTHER PUBLICATIONS

R Becher, M Dillinger, M Haardt, W Mohr; Broadband wireless access and future communication networks; Jan. 2001 pp. 58-75.*

T Blum, C Paar; Montgomery Modular Exponentiation on Reconfigurable Hardware; IEEE Symposium on Computer Arithmetic, 1999.*

Marc Branchaud; A Survey of Public-Key Infrastructures; Mar. 1997.*

R. Falkl, P. Bende, N. J. Drew, ~Conformance and Security Challenges for Personal Communications in the Reconfigurable Era; 2001.*

(Continued)

Primary Examiner—Nasser G Moazzami
Assistant Examiner—Mohammad W Reza
(74) Attorney, Agent, or Firm—Finnegan, Henderson, Farabow, Garrett & Dunner, L.L.P.

(57) ABSTRACT

A wireless data communication apparatus having a tamper resistant hardware package which includes a reconfigurable logic device which can be reconfigured in accordance with downloaded program, and a security check device for checking a software program. The encrypted bitfile 551 is decrypted using the terminal secret key 552 (S501). Next, the digital signature is decrypted using the government public key 553. Using hash function, the decrypted bitfile hash or fingerprint is calculated (S503), and if the two match (S504) then the software is legitimate and has not been modified since it was approved (S505).

15 Claims, 8 Drawing Sheets

OTHER PUBLICATIONS

A Kountouris, C Moy, L Rambaud; Re-configurability: a Key Property in Software Radio Systems; First Karlsruhe Workshop on Software Radios, Mar. 2000.*

N Nakajima, R Kohno, S Kubota; Research and developments of software-defined radio technologies in Japan; IEEE Communications Magazine, 2001.*

Makoto Sugita: Flexible security systems and a new structure for electronic commerce on software radio, 2000 IEEE.*

Mihaljevic et al., "Cryptanalysis of TOYOCRYPT-HS1 Stream Cipher", IEICE Transactions on Fundamentals of Electronics, Communications, and Computer Sciences, Jan. 2002, pp. 66-73, vol. E85-A, Engineering Sciences Society, Tokyo, Japan.

Mihaljevic et al., "Fast Correlation Attack Algorithm With List Decoding and an Application", Lecture Notes in Computer Science, 2002, pp. 196-210, vol. 2355, Springer-Verlag, Berlin, Germany.

Mihaljevic et al., "On Decoding Techniques for Cryptanalysis of Certain Encryption Algorithms", IEICE Transactions on Fundamentals of Electronics, Communications, and Computer Sciences, Apr. 2001, pp. 919-930, vol. E84-A, Engineering Sciences Society, Tokyo, Japan.

Mihaljevic et al., "A Low-Complexity and High-Performance Algorithm for the Fast Correlation Attack",Lecture Notes in Computer Science, 2001, pp. 196-212, vol. 1978, Springer-Verlag, Berlin, Germany.

Mihaljevic et al., "An Algorithm for Cryptanalysis of Certain Keystream Generators Suitable for High-Speed Software and Hardware Implementations", IEICE Transactions on Fundamentals of Electronics, Communications, and Computer Sciences, Jan. 2001, pp. 311-318, vol. E84-A, Engineering Sciences Society, Tokyo, Japan.

Mihaljevic et al., "A Family of Fast Keystream Generators Based on Programmable Linear Cellular Automata over GF (q) and Time-Variant Table", IEICE Transactions on Fundamentals of Electronics, Communications, and Computer Sciences, Jan. 1999, pp. 32-39, vol. E82-A, Engineering Sciences Society, Tokyo, Japan.

Mihaljevic et al., "A Family of Fast Dedicated One-Way Hash Functions Based on Linear Cellular Automata over GF (q)", IEICE Transactions on Fundamentals of Electronics, Communications, and Computer Sciences, Jan. 1999, pp. 40-47, vol. E82-A, Engineering Sciences Society, Tokyo, Japan.

Mihaljevic et al., "A Method for Convergence Analysis of Iterative Probabilistic Decoding", IEICE Transactions on Information Theory, Sep. 2000, pp. 2206-2211, vol. 46 No. 6.

Fossorier et al., "Reduced Complexity Iterative Decoding of Low-Density Parity Check Codes Based on Belief Propagation", IEEE Transactions on Communications, May 1999, pp. 673-680, vol. 47 No. 5.

Krawczyck, "The Order of Encryption and Authentication for Protecting Communications (or: How Secure Is SSL?)", CRYPTO 2001, Lecture Notes in Computer Science, 2001, pp. 310-331, vol. 2139, Springer-Verlag, Berlin, Germany.

Preneel et al., "Security Evaluation of NESSIE First Phase", available at http://www.cryptonessie.org.

A.J. Menezes et al., Handbook of Applied Cryptography, 1997, pp. 321-363, 425-481, Bocan Raton, FL.

* cited by examiner

WIRELESS DATA COMMUNICATION METHOD AND APPARATUS FOR SOFTWARE DOWNLOAD SYSTEM

DETAILED DESCRIPTION OF THE INVENTION

1. Field of the Invention

The present invention relates to a wireless data communication apparatus, a software download system and method, and particularly relates to a software download system with authentication, verification of Integrity and encryption for software defined radio (SDR).

2. Description of the Related Art

One of the most pressing issues for the introduction of software defined radio (SDR) systems is the authentication and verification of integrity of the software that is being downloaded. Specifically, any wireless device or system is currently required to obtain approval from appropriate governmental authorities. In a software defined radio system, it is likely that the government will use type approval for each software program and hardware combination. However, since re-programmable hardware is used, if the software is illegally modified from when it was submitted to the authorities, or indeed has never been approved then that may cause the wireless device to emit radiation illegally, which may cause harm to other users in the form of interference, or even physical harm to the user of the device.

Therefore, there must be a method of ensuring that the software downloaded is intact and has not been modified (verification of integrity) and that it has obtained government approval (authentication). Most likely it will also be preferable for the government to know bow many of which types of software are presently being distributed.

Furthermore, in the event that some modified software was created, there should be some mechanism to prevent the spread of that illegal software.

As a further necessity for the introduction a software downloadable SDR system the software should be protected against theft by people or companies who would like to know the details of the software employed by a rival company.

The current state of the art for downloading of programs to mobile terminals includes the download to mobile terminals in the form of extremely small programs such as "applets" with the size of the programs ranging from about 10 k-bytes to 50 k-bytes. The majority of these programs are entertainment oriented. The feature of these programs is that they do not interfere with the actual physical parameters of the radio wave emitting device.

A software defined radio terminal does intend to modify the physical radio parameters of the device and therefore the issues involved are much more serious. The size of the file will be much larger, for example the bit file size for a FPGA (field programmable gate array) of 1,000,000 gates is approximately 766 k (Virtex 1000E). The complexity and therefore the knowledge which goes into each file will be much larger and therefore worth more to protect.

Some patents about the security of downloading bit files to FPGA reconfigurable logic devices have been proposed. U.S. Pat. No. 6,118,869 discloses a scheme where each FPGA has a factory-programmed key which decodes the encrypted bit-file. However, since each FPGA uses the same key purchase of another FPGA can be used to replicate the software product without breaking the encryption code.

To improve on this scheme U.S. Pat. No. 6,118,869 proposes to use a scheme composed of circuitry which decrypts an encrypted bit-stream. The starting value of the Key Register comes from an initial key which is stored (secretly) on the device.

As a motivation for developing a novel method for the downloading, we first point out some cryptographic weaknesses in the U.S. Pat. No. 6,118,869 showing how it may be able to find out the initial secret key and thus decode the secret key.

Particularly, the proposed invention detailed below shows a more secure method of encrypting a bitfile to a programmable logic device.

Recognizing that enciphering of the downloading data is not enough for obtaining the desired level of the downloading security, we proposed a method where the bitfile to be downloaded can be verified to come from a particular source.

Furthermore, we propose a method where the relationships between government agencies, software and hardware manufacturers is presented.

A motivation for developing an improved secure download technique was also analysis and security evaluation of the scheme for encryption/decryption of the configuration bit-streams in a programmable logic device reported in U.S. Pat. No. 6,118,869.

In U.S. Pat. No. 6,118,869, it is claimed that "one embodiment includes circuitry for altering a decryption key for a plurality of encrypted bit-stream portions providing a high level of security". The claim underlying idea for employment a plurality of the sequences for the ciphering, instead of only one, is correct, but as will be shown in the following analysis, the scheme proposed in U.S. Pat. No. 6,118,869 is vulnerable and does not provide the claimed high level of security.

More precisely, it is correctly pointed out in U.S. Pat. No. 6,118,869 that one available but fairly limited method of protecting the bit-stream is encrypting the bit-stream before, and then decrypting the bit-stream inside the FPGA using a factory-programmed, fixed key, hardwired into the device, but that this approach has a number of drawbacks. One of the problems arises in a situation when the key is fixed at the factory if all the FPGA's have the same key, because the design-copier need only buy a designer's product, copy the encrypted bit-stream, and buy an FPGA that has the key that he needs. Then, the product can be replicated with ease on the decrypting devices without breaking the encryption code.

Accordingly, U.S. Pat. No. 6,118,869 proposes employment of a protection technique which is based on the varying ciphering sequences generated by a key modification circuit. The key modification circuit modifies the decrypt key for a plurality of bit-stream portions, and in one embodiment, the key modification circuit includes a linear feedback shift register. Although based on the previous correct underlying ideas, the encryption techniques proposed in U.S. Pat. 6,118,869 has a serious weakness as it will be shown below.

The ciphering scheme proposed in U.S. Pat. No. 6,118,869 is a variant of the stream cipher based on a key-stream generator, and enciphering/deciphering is performed employing bit-by-bit modulo 2 addition and a binary sequence generated by the key-stream generator. In any of the embodiments, the key-stream generator proposed in U.S. Pat. No. 6,118,869 is a Binary Finite State Machine (BFSM). In a general case BFSM consists of binary cells, and let the binary vector $$[S_t(m)]_{m=1}^{M}$$

denote the state of BFSM in the time instant t, t=1,2, . . . Accordingly, a model for the decryption scheme proposed in U.S. Pat. No. 6,118,869 is displayed in FIG. 8.In a particular case BFSM is equivalent to an Linear Feedback Shift Register (LFSR).

Let $$[b_n]_{n=1}^N$$

denotes the bit-string for an FPGA.

For each t+1,2, . . . , the encryption scheme proposed in U.S. Pat. No. 6,118,869 works as the following:

$$C_{(t-1)M+m} = b_{(t-1)M+m} \oplus s_t(m) \quad (1)$$

m=1,2, . . . M where the bit $c_{(t-1)M+m}$ is the encrypted form of the bit $b_{(t-1)M+m}$, and where the binary vectors $$[C_{(t-1)M+m}]_{m=1}^M$$

and $$[b_{(t-1)M+m}]_{m=1}^M$$

can be considered as the words of the corresponding binary sequences. Accordingly, for each t=1,2, . . . , the decryption is works as the following:

$$b_{(t-1)M+m} = c_{(t-1)M+m} \oplus s_t(m) \quad (2)$$

m=1,2, . . . M

The main security problem of the ciphering technique proposed in U.S. Pat. No. 6,118,869 originates from the following:

(1) in each time instant the complete BFSM state is employed for deciphering (enciphering);

(2) knowledge of only one BFSM state enables recovering of all further states.

Finally, for the security evaluation, we assume the following:

(i) the complete structure of BFSM is known;

(ii) for $t=t_0$ the word $$[b_{(t-1)M+m}]_{m=1}^M$$

Both the assumptions (i)-(ii) are a standard ones for the security evaluation, and a high secure ciphering scheme could be resistant against any method for attacking which is based on these assumptions.

The following approach compromise the claimed security of the evaluated ciphering technique from U.S. Pat. No. 6,118,869:

(1) for $t=t_0$ recover the BFSM state based on the following $$s_{t_0}(m) = c_{(t_0-1)M+m} \oplus b_{(t_0)1)M+m} \quad (3)$$

m=1,2,. . . M (2) initialize the BFSM with the recovered state and recover the remained BFSM states.

Accordingly, the ciphering scheme proposed in U.S. Pat. No. 6,118,869 suffer from the fact in each time instant t, the complete internal state of BFSM is employed for enciphering/deciphering.

In order to improve previous proposals for the secure download and to obtain an appropriate, high level of the security, a novel method for the secure downloading has been developed. The developed method, from the security point of view, specifies a system for highly secure download of the data for software defined radio.

Manner of Practicing the invention

SUMMARY OF THE INVENTION

In order to improve previous proposals for the secure download and to obtain an appropriate, high level of security, a novel method for the secure downloading of software for a software defined radio (SDR) terminal has been developed.

The main goals of the security system are the following: (i) verification of the declared identity of the source which emits the software data to be downloaded; (ii) control and verification of integrity of the downloaded data; (iii) disabling of the ability to run unauthorized software on the software defined terminal; (iv) secrecy of the transmitted data to prevent the problems of wire-tapping.

The system includes the following parties: manufactures of the terminal hardware and software; government authorities relevant for software defined radio users of the software defined radio terminals, and wireless service providers who provide connectively between the fixed infrastructure and the wireless terminals.

The underlying ideas for the system development include employment of four different cryptographic techniques and employment of the tamper resistant hardware. The employed cryptographic techniques are the following: (a) a secret key encryption technique; (b) a public key encryption technique; (c) a technique for cryptographic hashing and (d) a technique for the encryption of the hash where (c) and (d) combined are usually known as a digital signature.

According to one aspect of the present invention, a wireless data communication apparatus comprising: a reconfigurable logic device which can be reconfigured in accordance with downloaded program; a security check device for checking a software program to be downloaded to said reconfigurable logic whether the software program is proper; Wherein the reconfigurable logic device and the security check device are configured in one tamper resistant hardware package.

According to another aspect of the present invention, the security check device executes authentication procedure by checking a digital signature attached to said software program.

According to another aspect of the present invention, the security check device executes verification of integrity of said software program by calculating hash value based on said software program data.

According to another aspect of the present invention, the tamper resistant hardware package further comprises a memory storing a secret key; and the security check device executes decryption of encrypted said software program by using said secret key.

According to another aspect of the present invention, the tamper resistant hardware package further comprises a memory storing an authorized agency's public key; and the security check device checks digital signature attached to said software program by using said authorized agency's public key.

According to another aspect of the present invention, the reconfigurable logic is a field programmable gate array.

According to another aspect of the present invention, a method for downloading a software Program to a reconfigurable logic device configured in a wireless communication device, the method comprising: checking a software program to be downloaded to a reconfigurable logic whether said software program is proper; downloading the software program to the reconfigurable logic when the software program is concluded as a proper program by the checking process; wherein the checking process is executed by a security check device configured in one hardware package including the reconfigurable logic.

According to another aspect of the present invention, further comprising the steps of encrypting said software program by using a secret key in a server; transferring the encrypted software program from the server to a wireless communication device; receiving said encrypted software program by the wireless communication device; decrypting said encrypted software program; and then executing the software checking process and the downloading process.

According to another aspect of the present invention, said secret key is uniquely assigned to each wireless communication device.

According to another aspect of the present invention, the checking process includes the step of executing an authentication procedure by checking a digital signature attached to said software program.

According to another aspect of the present invention, the checking process includes the step of executing verification of integrity of said software program by calculating hash value based on said software program data.

According to another aspect of the present invention, the checking process includes the step of checking digital signature attached to said software program by using an authorized agency's public key.

According to another aspect of the present invention, a System for downloading a software Program to a reconfigurable logic device configured in a wireless data communication apparatus, the system comprising: a server which sends a software program to a wireless communication device for downloading to the reconfigurable logic in the wireless communication device; a wireless data communication apparatus having a tamper resistant hardware package which includes a reconfigurable logic device which can be reconfigured in accordance with downloaded program, and a security check device for checking a software program to be downloaded to said reconfigurable logic whether the software program is proper; Wherein the server encrypts the sending software program by using secret key which is uniquely assigned to each wireless data communication apparatus.

According to another aspect of the present invention, wherein the security check device executes authentication procedure by checking a digital signature attached to said software program.

According to another aspect of the present invention, the security check device executes verification of integrity of said software program by calculating hash value based on said software program data.

According to another aspect of the present invention, wherein the tamper resistant hardware package further comprises a memory storing a secret key; and the security check device executes decryption of encrypted said software program by using said secret key.

According to another aspect of the present invention, the tamper resistant hardware package further comprises a memory storing an authorized agency's public key; and the security check device checks digital signature attached to said software program by using said authorized agency's public key.

According to another aspect of the present invention, the reconfigurable logic is a field programmable gate array.

DESCRIPTION OF THE PREFERRED EMBODIMENTS (1) System Configuration

Figure 1:
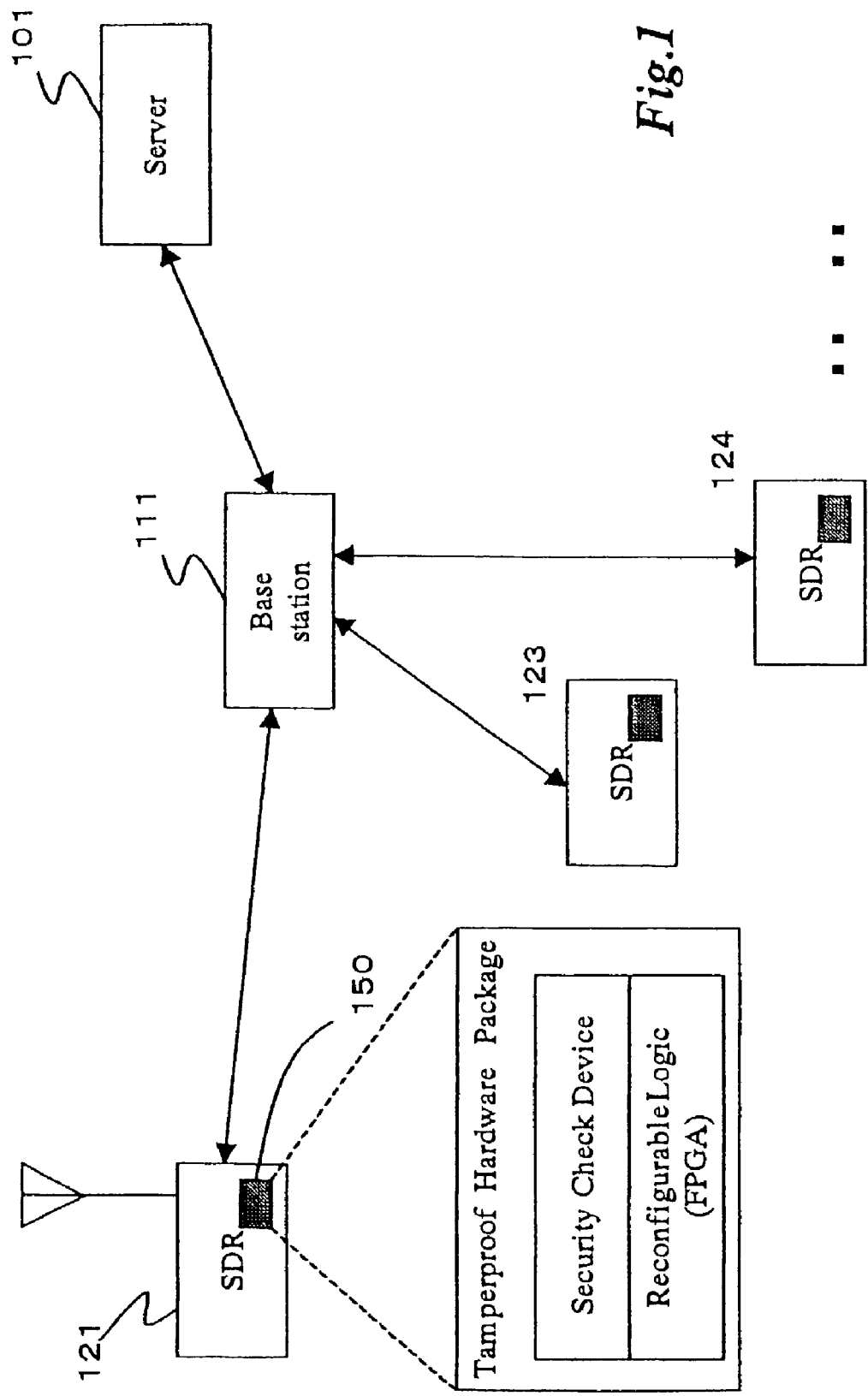
FIG. 1 illustrates a wireless network in which the present invention may be produced.

FIG. 1 shows a block diagram for a wireless network in which the present invention may be provided. Software defined radio (SDR) terminals 121,123,124 . . . may receive, transmit, or both using either simplex or duplex communication techniques. Reconfigurable logic (Programmable logic device (PLD)) is equipped in SDR. One type of PLD, a field programmable gate array (FPGA), typically includes elements such as configurable logic blocks (CLBs), input/output blocks (IOBs), and interconnect that programmably connects the CLBs and IOBs. The configuration of the CLBs, IOBs, and interconnect is determined by a bitstream. Reconfigurable logic is equipped in tamperproof hardware package 150. This tamperproof hardware package 150 includes a reconfigurable logic and devices for processing security functions, such as authentication, verification of integrity of the software to be download to the reconfigurable logic.

The bitstream for downloading to reconfigurable logic is sent from Server 101 through base station 111. Further software program (bitstream) can be loaded from storage devices such as optical memory devices, magneto memory devices, and so on.

(2) SDR Configuration

Figure 2:
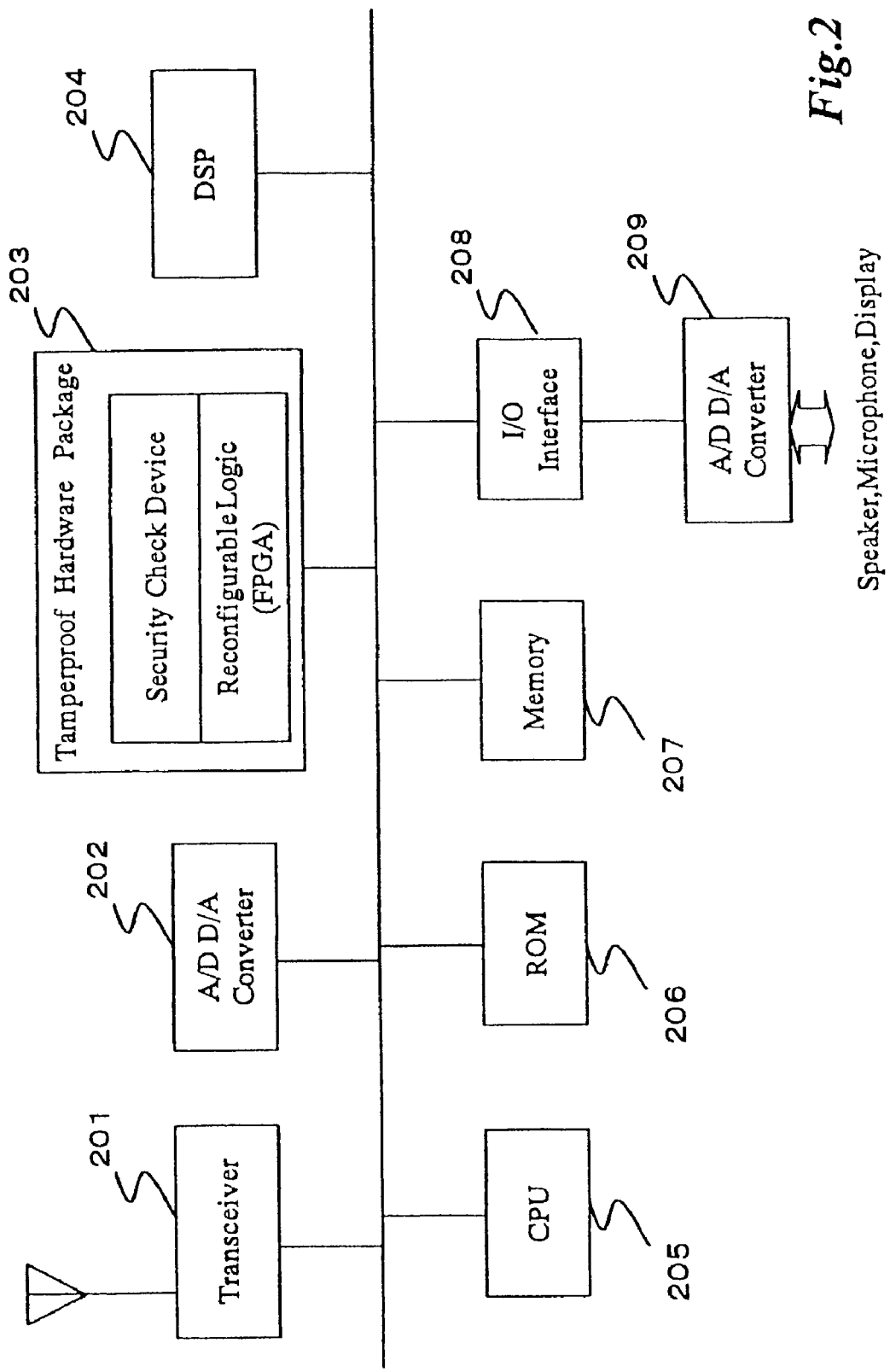
FIG. 2 is a block diagram for disclosing SDR configuration.

FIG. 2 shows a block diagram of a wireless data communication apparatus, for example SDR, in accordance with a preferred embodiment of the present invention. SDR comprises transceiver 201, A/D,D/A converter 202, tamperproof (tamper resistant) hardware package which includes reconfigurable logic and a device for processing security function, digital signal processor (DSP) 204, CPU 205, ROM 206, Memory 207, I/O interface 208 and A/D.D/A converter 209. Data can be transmitted between above mentioned elements through a data bus.

A software program (bitstream) to be downloaded to the reconfigurable logic in tamperproof hardware package 203 is received by transceiver 201, and transmitted to tamperproof hardware package 203. Security check process for the transmitted program is executed by a security check device in tamperproof hardware package 203. The security check device verifies whether a program is proper, and only the verified program is permitted to be downloaded to the reconfigurable logic.

The security check device equipped in the tamper resistant hardware package comprises a processing unit for executing security check process as to a software program to be downloaded to the reconfigurable logic in the same tamper resistant hardware package.

The security check device further comprises memory storing a secret key. A processing unit in a security check device executes decryption of an encrypted software program by using said secret key. In one example, this secret key is uniquely assigned to each wireless data communication apparatus.

The security check device further comprises memory storing an authorized agency's public key. The security check device checks digital signature attached to a software program by using the authorized agency's public key.

The security check device equipped in a tamper resistant hardware package executes authentication procedure by checking a digital signature attached to a software program, and executes verification of integrity of the software program by calculating hash value based on software program data.

(3) Methods Employed in the Systems

The underlying ideas for the system development include the following:

(a) employment of four different cryptographic techniques;

(b) employment of the tamper resistant hardware.

The employed cryptographic techniques are the following:

a secret key encryption technique a public key encryption technique a technique for cryptographic hashing a technique for the digital signature.

Let [D] denote the data to be processed by certain cryptographic technique, and recall the following:

(i) A secret key (symmetric) encryption system usually employ the same cryptographic key [K] which should be kept secret for encryption and decryption so that the following is valid $$S=E_K(D),$$

$$D=E_K^{-1}(S)$$

where $E_K(\ )$ and $E_K^{-1}(\ )$ denote the encryption and decryption transformations controlled by the secret key [K],respectfully, and [S] denotes enciphered data [D].

Note that $E_K(\ )$ and $E_K^{-1}(\ )$ also assume employment of certain random but public randomization parameters if it required by that particular encryption techniques (for example stream ciphers).

(ii) A public key (asymmetric) encryption system is based on two corresponding cryptographic keys: the public key [K] for enciphering and the secret key [K] for deciphering and the following is valid $$S=E_{PK}(D),$$

$$D=E_{SK}^{-1}(S)$$

(iii) A cryptographic hash function is an irreversible mapping of a data [D] of an arbitrary length into a constant length hash value [H]

$$H=\text{hash}(D),$$

assuming that the mapping hash( ) fulfill certain requirements and that the hash value $H$ can be considered as a digital fingerprint of corresponding [D].

(iv) In our construction we employ the digital signature [D] of the considered data [D] defined as the following.

$$D=E_{SK}^{-1}(S)$$

$$H=\text{hash}(D),$$

For the technical details related to the above cryptographic techniques an interested reader is refereed to "Handbook of Applied Cryptography" by A. J. Menezes, P. C. van Oorschot and S. A. Vanstone,CRC Press: Boca Rotton, Fla., 1997, for example.

The symmetric key encryption is used to prevent problems related to possible wire-tapping of downloaded data. The public key encryption, cryptographic hashing and digital signature techniques are employed to provide the integrity control of the downloading data, as well as the authenticity of the information source.

(4) Certain Characteristics of the System

To each wireless terminal a different secret key for the symmetric encryption purposes is assigned. Tamper resistant hardware is employed to provide a secure storage for the terminal secret key to be used for decrypting of the symmetric key encrypted data. Each terminal also contains the public key of the verification authority (the government) for the data to be downloaded.

The tamper resistant hardware can take several forms. In the preferred embodiment it is a collection of logic gates which is separate from but included as part of the same package as an FPGA device. The reason for this is to maintain maximum area and flexibility in designing systems with current FPGA devices.

Alternatively, the logic which provides the security function may reside in the FPGA as long as it can be determined that this cannot be removed and is indeed tamper resistant.

The system is developed having in mind a flexibility in the sense that it can employ either reported (traditional) cryptographic techniques for encryption and hashing or novel ones specially designed for certain downloading system.

Also note that our construction take into account all relevant up to now reported results, for example M. Mihaljevic and H. Imai, "Cryptanalysis of TOYOCRYPT-HS1 stream cipher", to appear in IEICE Transactions on Fundamentals, vol. E85-A, January 2002.

M. Mihaljevic, M. P. C. Fossorier and H. Imai, "Fast correlation attack algorithm with the list decoding and an application", to appear in Lecture Notes in Computer Science, 2001.

M. Mihaljevic, M. P. C. Fossorier and H. Imai, "On decoding techniques for cryptanalysis of certain encryption algorithms", IEICE Transactions on Fundamentals, vol. E84-A, pp. 919-930, April 2001.

M. Mihaljevic, M. P. C. Fossorier and H. Imai, "A low-complexity and high-performance algorithm for the fast correlation attack", Lecture Notes in Computer Science, vol. 1978, pp. 196-212, 2001.

M. Mihaljevic, M. P. C. Fossorier and H. Imai, "An algorithm for cryptanalysis of certain keystream generators suitable for high-speed software and hardware implementations", IEICE Transactions on Fundamentals, vol. E84-A, pp. 311-318, January 2001.

M. Mihaljevic and H. Imai, "A family of fast keystream generators based on programmable linear cellular automata over GF(q) and time variant table", IEICE Transactions on Fundamentals, vol. E82-A, pp. 32-39, January 1999.

M. Mihaljevic, Y. Zheng and H. Imai, "A family of fast dedicated one-way hash functions based on linear cellular automata over GF(q)", IEICE Transactions on Fundamentals, vol. E82-A, pp. 40-47, January 1999.

M. Mihaljevic and J. Golic, "A method for convergence analysis of iterative probabilistic decoding", IEEE Transactions on Information Theory, vol. 46, pp. 2206-2211, September 2000.

M. Fossorier, M. Mihaljevic and H. Imai, "Reduced complexity iterative decoding of Low Density Parity Check codes based on Belief Propagation", IEEE Transactions on Communications, vol. 47, pp. 673-680, 1999.

H. Krawczyck, "The order of encryption and authentication for protecting communications (or: How secure is SSL)",Advance in Cryptology—CRYPTO 2001, Lecture Notes in Computer Science, vol. 2139, pp. 310-331,2001.

"Security Evaluation of Nessie First Phase", NESSIE Report,September 2001. http://www.cryptonessie.org.

(5) Digital Signature for Authentication and Verification of Integrity

Figure 3:
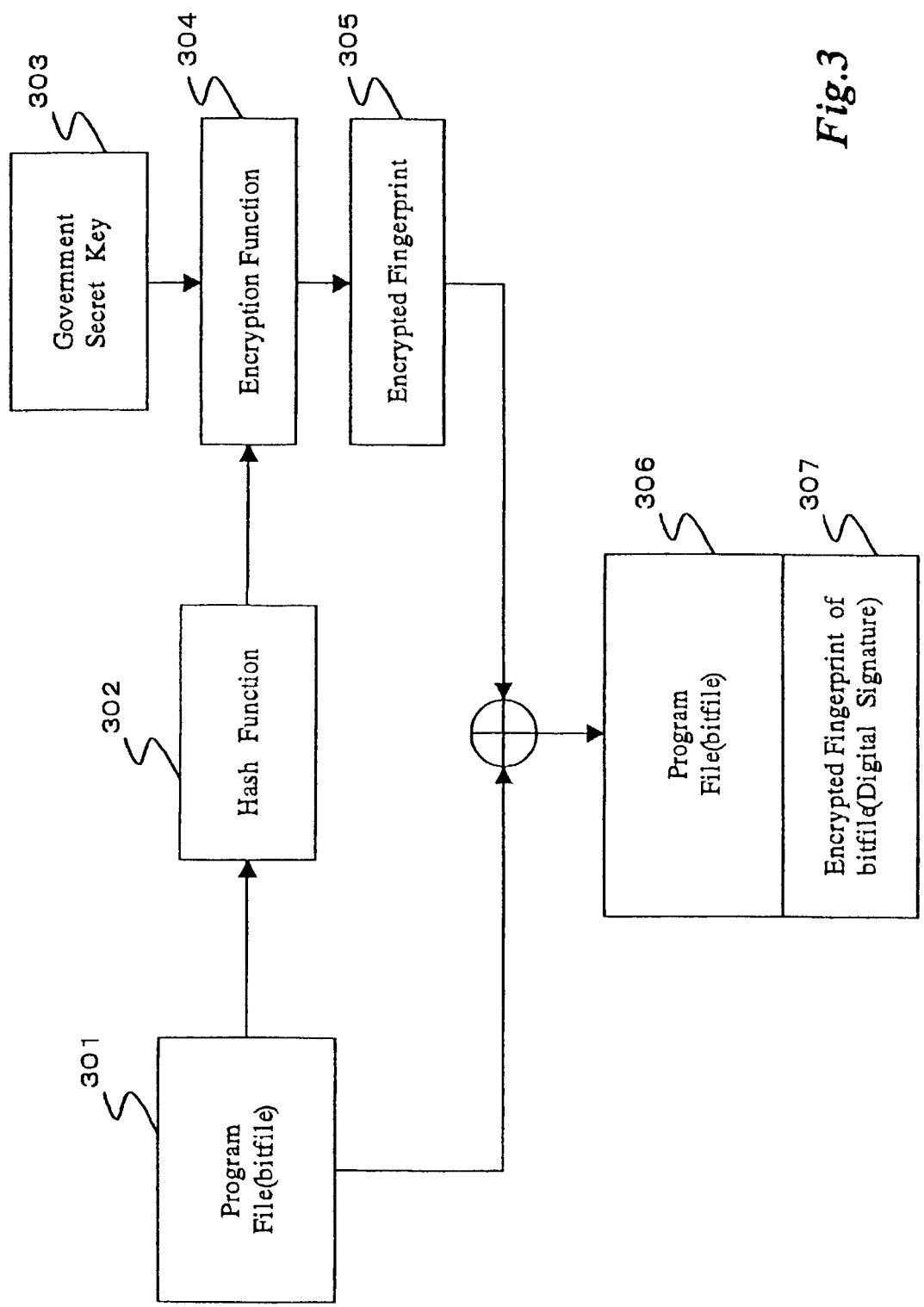
FIG. 3 illustrates digital signing of program bitfile by government approval agency after testing and ensuring software meets appropriate regulatory guidelines.
Figure 4:
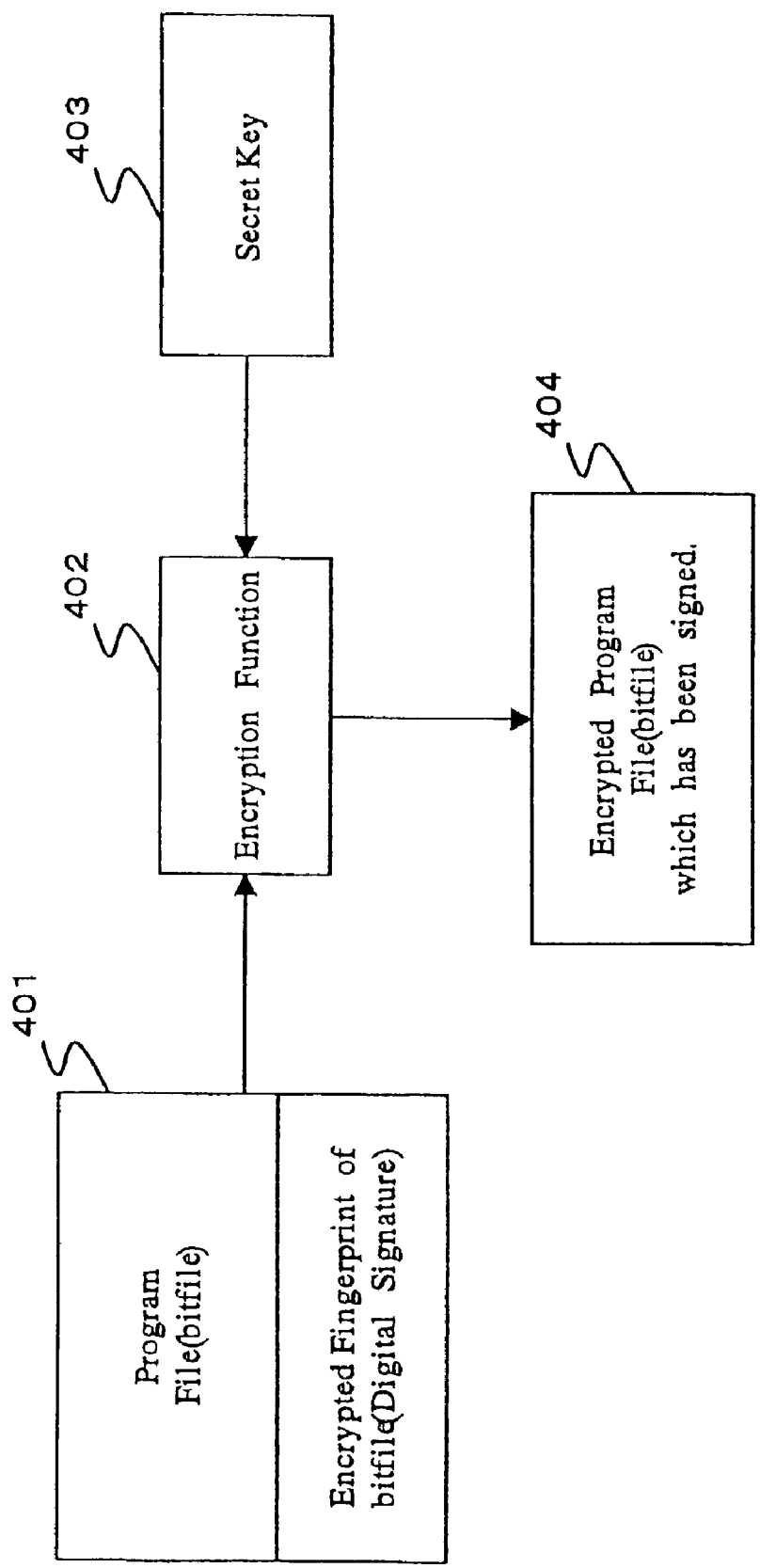
FIG. 4 illustrates generation of encrypted program file by handset manufacturer by using the stored secret key of a particular terminal.

The generation of the digital signature is shown in FIG. 3. First, the software or program file 301, for example bit file which can be downloaded to a re-programmable logic like an FPGA, is submitted to the authorities for testing. Once it has been approved, the software will be signed using the authority's, for example governments, secret key [K] 303. No one apart from the government has access to or knowledge of this secret key. The digital signature generated is unique for a particular piece of software [D] due to the nature of the hash function hash, and now if the terminal manufacturer changes the software, they must reapply to have the software validated again.

Therefore, the digital signature is $$DS=E_{SK}^{-1}(H)$$

where $$H=\text{hash}(D),$$

Therefore the digital signature consists of a hash 302 and an encryption function 304. Even if the hash function 302 is a well known one, for example the MD5 algorithm is one commonly used, the encryption of the hash function by the secret government key 303 makes it extremely difficult to forge the digital signature for that piece of software, where the degree of difficulty depends to forge depends on the key length and algorithm employed. After these processes executed by Hash function 302 and Encryption function 304, Encrypted fingerprint 305 is output.

The software bitfile is now signed as being legitimate, that is approved software. The approved software consists of Program file (bitfile) 306 and encrypted fingerprint of bitfile 307.

(6) Encryption to a Particular Terminal

The encryption of the bitfile and the digital signature is done by using a pair of secret keys [K]. One copy of the key is stored on the terminal and the other is stored in the terminal manufacturers database.

The generation of the encrypted and signed bitfile [S] is shown in figure.

This [S] is represented by $$S=E_K(D')$$

where $$D'=D+DS$$

The signed bitfile 401 is encrypted by encryption function 402 with a secret key 403 which is valid only for a single terminal. This process creates signed and encrypted program 404. That is, only that terminal has the knowledge of the secret key 403. The secret key 403 is stored in tamper proof hardware on the terminal device. Since symmetric encryption techniques are used, the encryption and decryption is much faster then asymmetric techniques. This is an advantage for real-time encryption and also for speedy loading of the bitfile into the FPGA.

In the unlikely event that a secret key was stolen, the attacker still cannot generate legitimate software since they cannot correctly digitally sign any software without also the government's secret key.

Even if that was stolen as well, the most danger that could be done is the generation of illegal software for at most one terminal. Incorrect or otherwise modified software cannot be distributed wholesale without knowledge of each terminals' individual secret key. This makes it extremely difficult to spread software which will create havoc, and severely reduces the gain for the attacker even if they can somehow break the encryption used.

It must be noted that since the distribution of keys is accomplished at the time of manufacture, there is no need to have a method to securely-distribute the keys after that time.

Furthermore, we propose that the encryption and delivery of the software may be done in real time. That is, after the request of by the user for download of a particular piece of software, the software can be encrypted to that terminal and sent within a reasonable amount of time. This reduces the time that the encrypted software is available on the network, lessening the chance of it being stolen for later off-line attacks.

(7) Decryption at the Terminal

Figure 5:
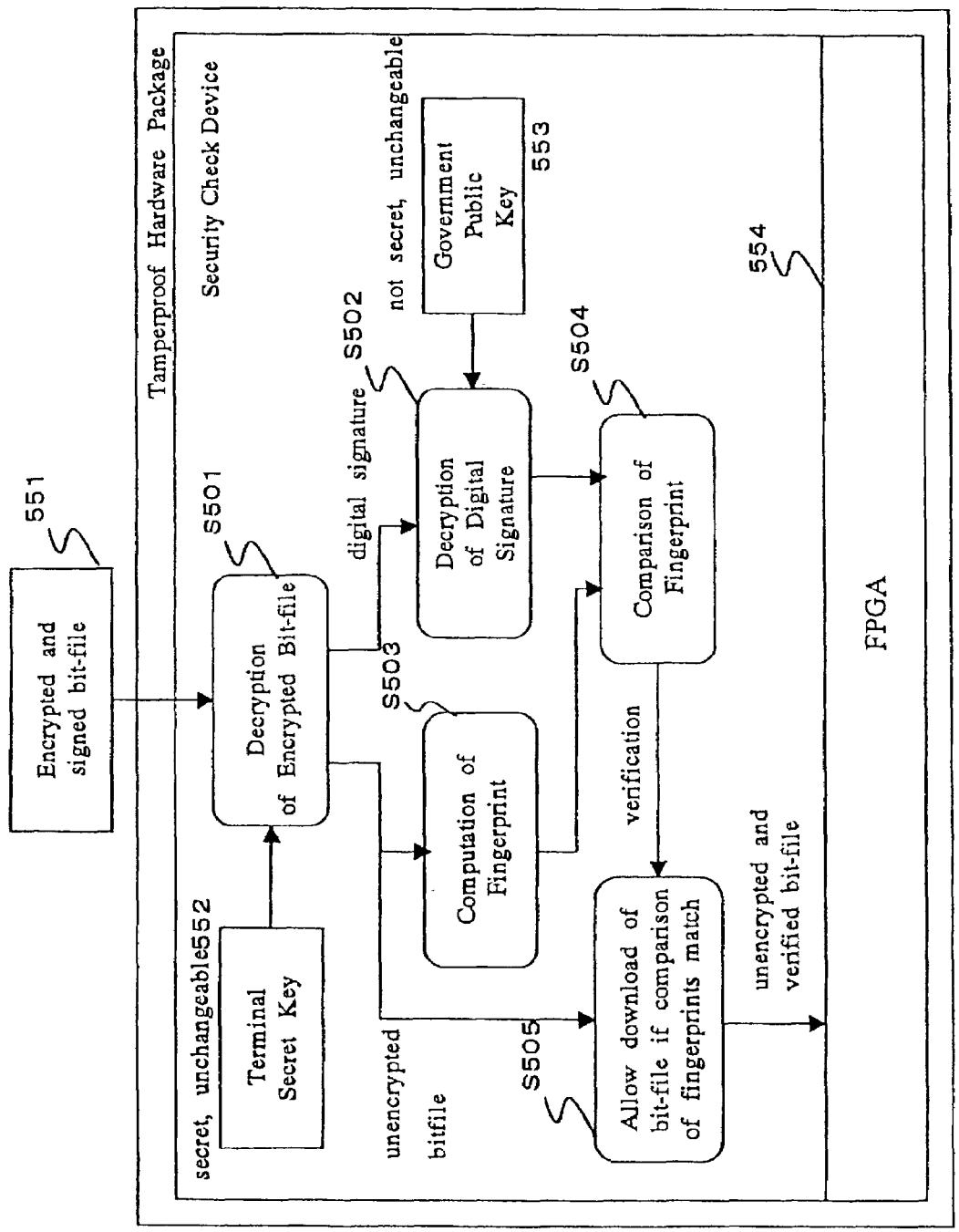
FIG. 5 illustrates secure terminal hardware design and functionality. The FPGA and security functions are all in the same tamperproof package.

The functionality diagram of the terminal hardware is shown in FIG. 5.

The decryption and verification of the downloaded software is essentially the reverse of the encryption process.

First the encrypted bitfile 551 is decrypted using the terminal secret key 552 (S501). Next, the digital signature (which is an encrypted hash function) is decrypted using the government public key 553, available to all terminals (S502). Using the known hash function the decrypted bitfile hash or fingerprint is calculated (S503), and if the two match (S504) then the software is legitimate and has not been modified since it was approved (S505).

Therefore, based on this verification of integrity and authentication, the bitfile should be downloaded into the FPGA. If the fingerprints do not match, then the software has been modified or is not signed and approved by the government, and is not loaded and the appropriate error messages should be displayed to the user.

The security check described above is executed by a security check device which is equipped in a tamper resistant hardware package which also comprises a reconfigurable logic such as FPGA.

Terminal secret key 552 and government public key 553 are stored in a memory in the security check device equipped in the tamper resistant hardware package. In one example, a manufacturer of wireless data communication apparatus, such as SDR, stores these key in tamper resistant hardware package.

(8) Proposed Relationships

Figure 6:
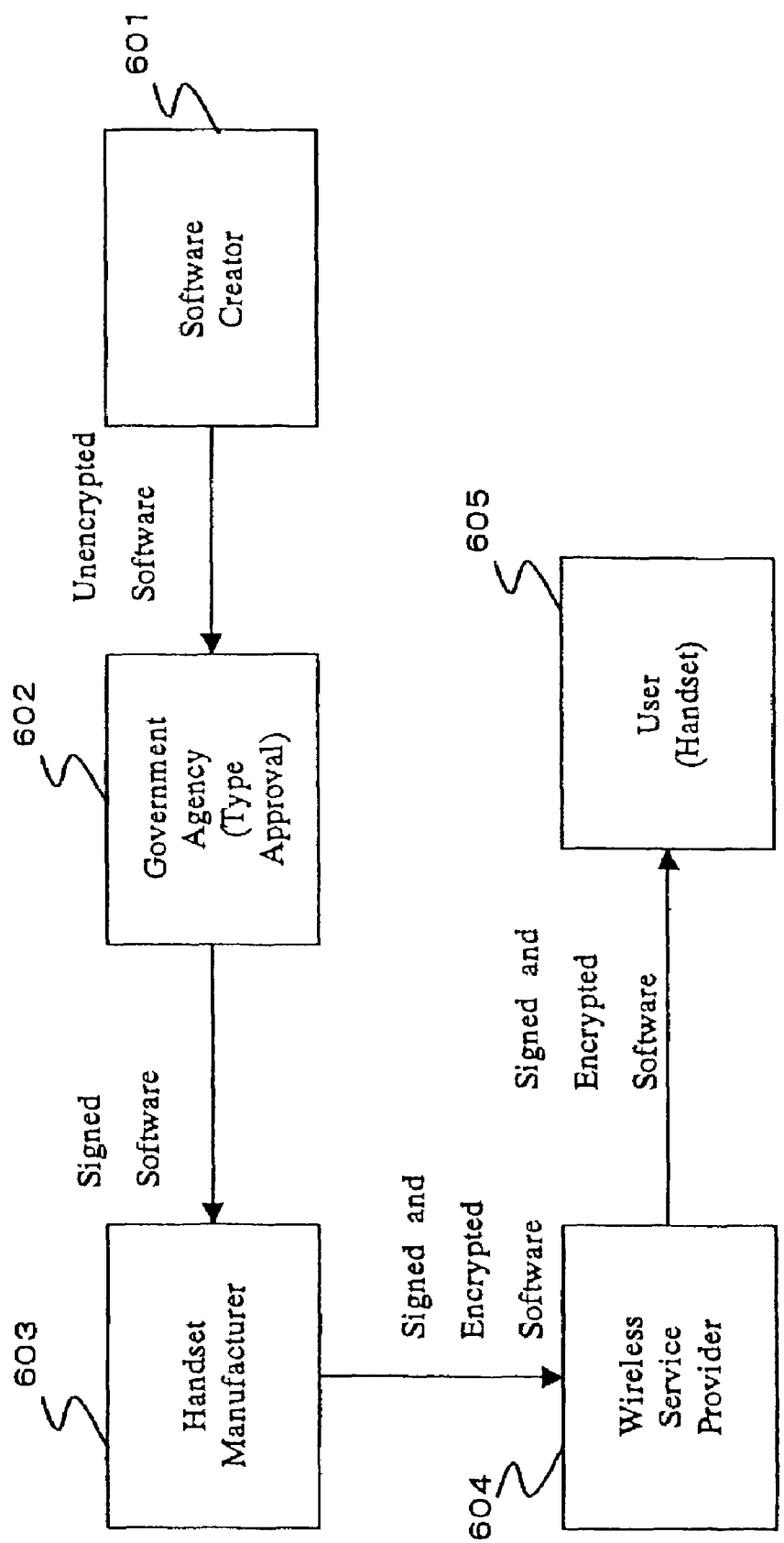
FIG. 6 illustrates proposed relationship between the hardware (terminal) manufacture, software creator, government authorizing agency, wireless service provider and the user, where the software creator and handset manufacturer are separate entities.
Figure 7:
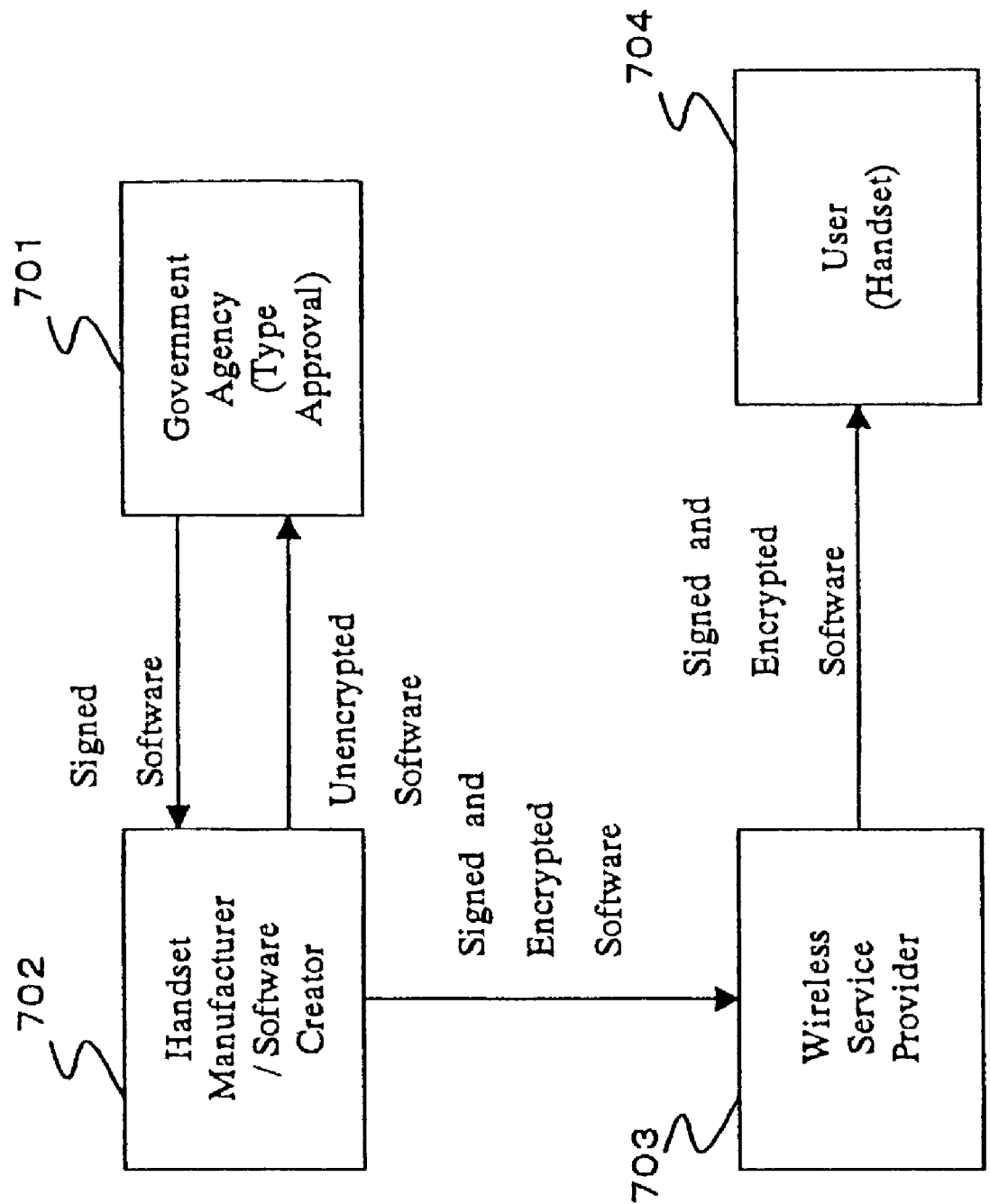
FIG. 7 illustrates proposed relationship between the hardware (terminal) manufacture, software creator, government authorizing agency, wireless service provider and the user, where the software creator and handset manufacturer are the same company.
Figure 8:
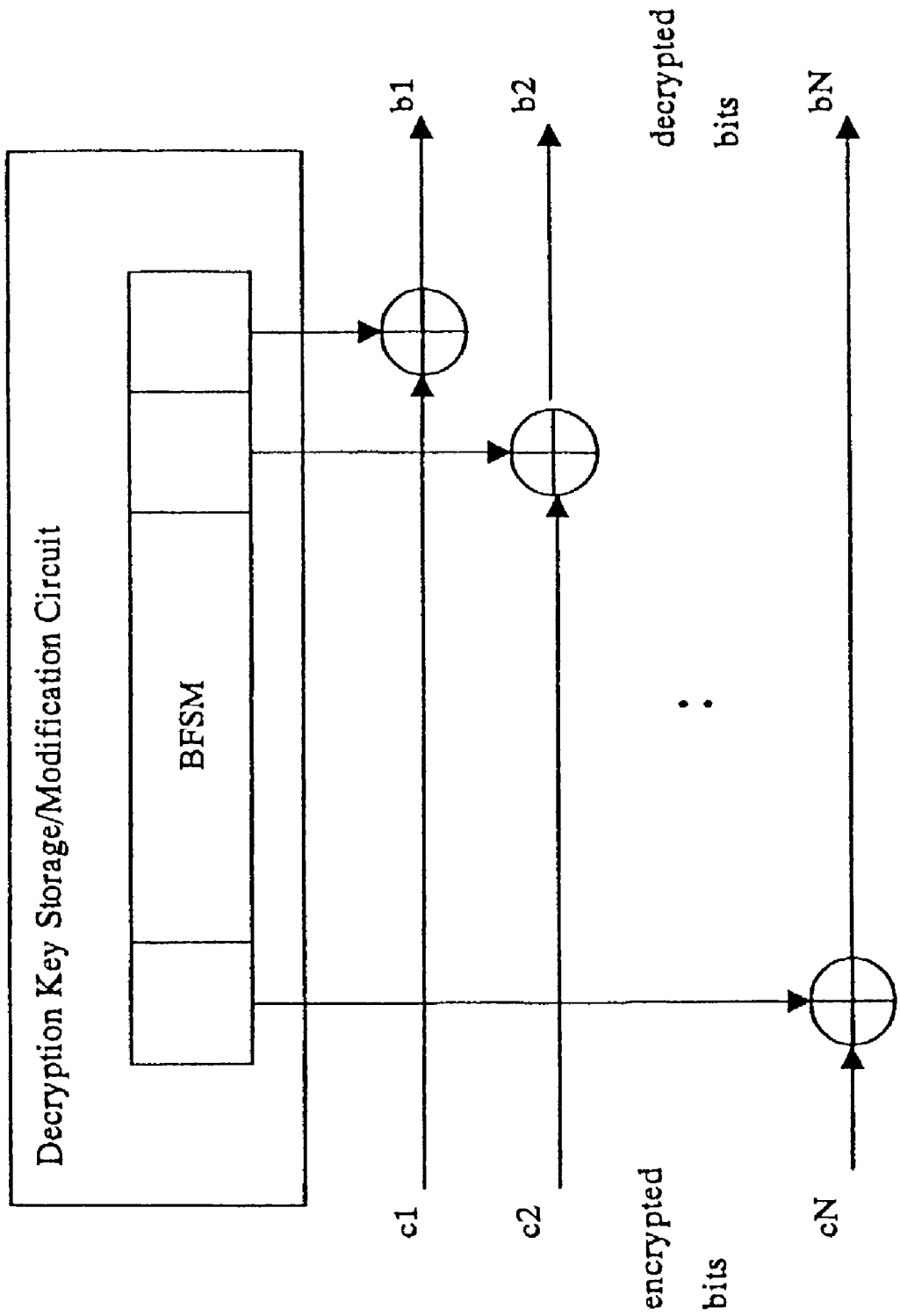
FIG. 8 represents a model of deciphering algorithm proposed in prior art.

In FIGS. 6 and 7 are the proposed relationships between the hardware (terminal) manufacture, software creator, government authorizing agency, wireless service provider and the user.

In essence this is a manufacturer-centric model. That is, the security hardware algorithms will be designed and implemented by the terminal manufacturer, and in all likelihood will be secret and proprietary. However, they may be open and examined by third parties in some cases. The database of users' secret keys are stored at the manufacturer. The encryption is performed at the manufacturer.

The wireless provider may also offer wireless encryption methods and other authentication methods. The proposed scheme is separate and above all those schemes offered by the wireless service provider, In FIG. 6, the software created by Software Creator 601 is submitted to the government 602. This software is unencrypted. This will require strict agreements between the government 602 and also the handset manufacturer 603 and the software creator 601.

The government 602 provides Signed software to the handset manufacturer 603. The handset manufacturer 603 encrypts the received software and provides the signed and encrypted software to the wireless service provider 604. The wireless service provider 604 transfers the received data to User(Handset)605.

However, we note that if the software is a bitfile for a FPGA, while unencrypted it still requires much effort to view the source code in a natural manner.

Furthermore, as shown in the more realistic relationship graph of FIG. 7, the manufacturer and the software creator will be the same company 702. This will be the more usual scenario, as the manufacturer 702 will want to write software which takes advantage of particular hardware features of their own terminal.

In FIG. 7, the software created by the handset manufacturer/software creator 702 is submitted to the government 701. This software is unencrypted. The government 701 provides signed software to the handset manufacturer/software creator 702. The handset manufacturer/software creator 702 encrypts the received software and provides the signed and encrypted software to the wireless service provider 703. The wireless service provider 703 transfers the received data to User(Handset) 704.

The wireless service providers will also be part of the system but they so not play an active part in the proposed scheme. Therefore, our scheme operates independently of any wireless encryption techniques, modulation methods, frequency bands and so on which may be used and specified by that wireless provider.

Conclusion

According to the present invention, the approval, confidential transmission and verification of software to be download for a software defined radio system can be accomplished, as well as preventing usage of unapproved software.

According to the present invention, each terminal has software encrypted to it personally, allowing much greater security in the system which will be needed when bitfiles routinely change physical parameters of the radio device, as they do on a software radio terminal.

According to the present invention, the system is a flexible one, and it is open for implementations of the traditional cryptographic techniques as well as the novel ones especially developed for certain software defined radio environments.

The invention claimed is:

1. A wireless terminal comprising:
a transceiver for downloading an encrypted software program and a government authorizing agency's digital signature, the government authorizing agency's digital signature including a hash value calculated for the software program; and
a tamper-resistant package comprising:
a reconfigurable logic device which can be reconfigured by loading the software program;
a memory storing a terminal secret key unique to the wireless terminal and a government public key corresponding to the government authorizing agency; and
a security check device for decrypting the software program with the secret key, and determining whether the government authorizing agency has authorized the software program for use by the wireless communication apparatus,
wherein the security check device determines whether the software program has been authorized by the government authorizing agency by calculating a hash value of the decrypted software program, decrypting the digital signature with the government public key, and comparing the hash value included in the government authorizing agency's digital signature with the hash value calculated by the security check device.

2. The wireless communication apparatus claimed in claim 1, wherein the received a digital signature is encrypted with a government private key corresponding to the government public key, the government private key being unique to the government authorizing agency.

3. The wireless terminal claimed in claim 1, wherein the reconfigurable logic device is a field programmable gate array.

4. The apparatus according to claim 1, wherein a manufacturer of the wireless terminal stores a copy of the terminal secret key in a database.

5. The wireless terminal according to claim 1, wherein the software program is loaded on the reconfigurable logic device if the security check device determines the software program is authorized by the government authorizing agency.

6. A method for downloading an encrypted software program to a wireless terminal including a reconfigurable logic device and a security check device, the method comprising:
storing, in the wireless terminal, a terminal secret key unique to the wireless terminal and a government public key corresponding to a government authorizing agency;
downloading, to the wireless terminal, an encrypted software program and a government authorizing agency's digital signature, the government authorizing agency's digital signature including a hash value calculated for the software program;
decrypting the software program with the terminal secret key;
determining, whether the software program has been authorized for use by the wireless terminal by calculating a hash value of the decrypted software program with the security check device, decrypting the digital signature with the government public key, and comparing the hash value included in the government authorizing agency's digital signature with the hash value calculated by the security check device.

7. The method claimed in claim 6, further comprising loading the software program on the reconfigurable logic device if the security check device determines the software program is authorized by the government authorizing agency.

8. The method claimed in claim 7 wherein:
the method is used to load software on reconfigurable logic devices in a plurality of wireless terminals;
there are a plurality of secret keys; and
the secret keys are uniquely assigned to each wireless terminal.

9. The method according to claim 6, wherein a manufacturer of the wireless terminal stores a copy of the terminal secret key in a database.

10. The method according to claim 6, wherein the digital signature is encrypted with a government private key corresponding to the government public key when downloaded to the wireless terminal, the government private key being unique to the government authorizing agency.

11. The method according to claim 6, wherein the reconfigurable logic device is a field programmable gate array.

12. A system for downloading an encrypted software program, the system comprising:
one or more wireless terminals; and
a server for downloading the software program to the one or more wireless terminals,
wherein each of the wireless terminals comprises:
a transceiver for downloading an encrypted software program and a government authorizing agency's digital signature, the government authorizing agency's digital signature including a hash value calculated for the software program; and
a tamper-resistant package comprising:
a reconfigurable logic device which can be reconfigured by loading the software program;
a memory storing a terminal secret key unique to the wireless terminal and a government public key corresponding to the government authorizing agency; and
a security check device for decrypting the software program with the secret key, and determining whether the government authorizing agency has authorized the software program for use by the wireless communication apparatus,
wherein the security check device determines whether the software program has been authorized by the government authorizing agency by calculating a hash value of the decrypted software program, decrypting the digital signature with the government public key, and comparing the hash value included in the government authorizing agency's digital signature with the hash value calculated by the security check device.

13. The system claimed in claim 12, wherein the digital signature received by the wireless terminals is encrypted with a government private key corresponding to the government public key, the government private key being unique to the government authorizing agency.

14. The system claimed in claim 12, wherein the reconfigurable logic device is a field programmable gate array.

15. The system according to claim 12, wherein the software program is loaded on the reconfigurable logic device if the security check device determines the software program is authorized by the government authorizing agency.

* * * * *